July 14, 1964 P. L. DE LUCA 3,140,638
FAIRING
Filed July 27, 1962
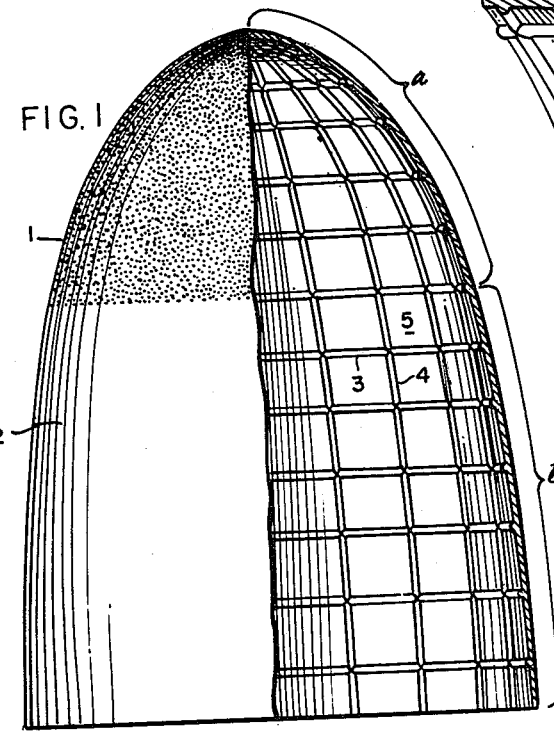
FIG. 1
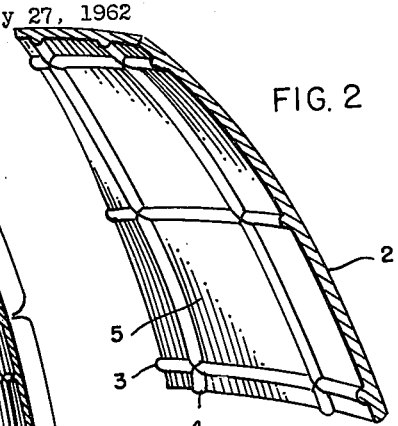
FIG. 2
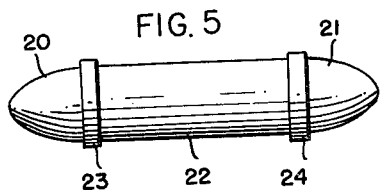
FIG. 5
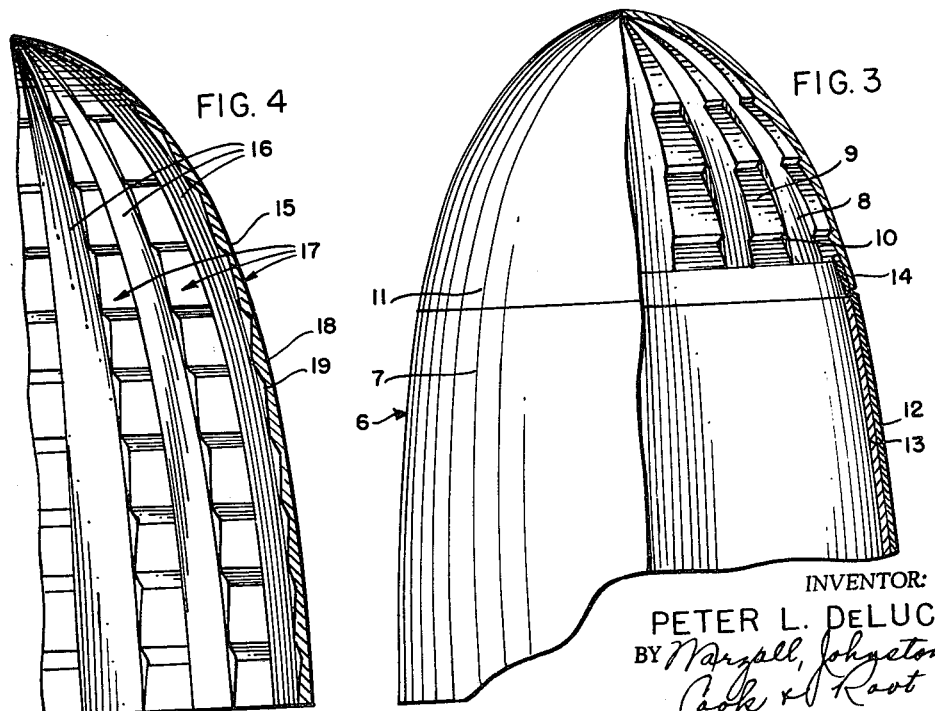
FIG. 4
FIG. 3
INVENTOR:
PETER L. DeLUCA
BY Marzall, Johnston, Cook & Root
ATT'YS the desired shape. The molded preform is then removed from the screen or mold and dried. The drying can be effected between heated male and female metal dies contoured to the shape of the molded piece and at least one of which contains perforations connected to a source of vacuum, whereby heated air is drawn through the molded piece and moisture is removed. The molded piece can also be dried by supporting it on a porous male mold or screen and drawing air through the piece by applying suction to the pores of the mold or screen. Mixtures of cut bundles of glass filaments and cellulose with resin additions can be accreted from aqueous slurries to produce stronger molded structures. Resin can be added also to give wet strength to the molded preform. Parez 607 (melamine-formaldehyde) is an example of a resin suitable for this purpose. The quantities used for this purpose are 0.5% to 5% by weight of the cellulose fiber. Such structures can contain, for example, 5–95% cut glass rovings, 95–5% cellulose, based on the total weight of fibers, and 5–25% resin based on the weight of fibers. Other materials of construction can be used.

3,140,638
FAIRING

Peter L. De Luca, Elgin, Ill., assignor to Hawley Products Company, St. Charles, Ill., a corporation of Delaware
Filed July 27, 1962, Ser. No. 212,944
10 Claims. (Cl. 89—1.7)

This invention relates to frangible fairings; in particular to nose and tail fairings adapted for use on rocket launchers.

Typically, a rocket launcher comprises an outer housing for a rocket which is attached to the underside of an aircraft wing. The housing is usually cylindrical in shape although it may have a series of planar sides. It is necessary to provide both nose and tail fairings for the launcher housing to reduce drag and smooth the air flow around the housing. This is particularly necessary with modern, super-sonic jet aircraft. The fairings so utilized must thus be structurally strong enough to withstand the considerable air pressures to which they are subjected and must also have the required aerodynamic characteristics.

When the rockets are fired from within the launcher housing, the fairings are broken, the nose fairing by the passage of the rocket and the tail fairing by the blast or exhaust gases from the rocket. Considerable difficulty has been encountered with the fragments, resulting from the break-up of the fairings, damaging various portions of the aircraft. Large fragments that have broken away from the nose fairing cause skin damage to the undersides of the wings; similarly, fragments from the tail fairing damage the horizontal stabilizers of the aircraft. The primary object of the invention is, therefore, to provide nose and tail fairings that have the desired structural and aerodynamic properties but that will fragmentize without resultant damage to the aircraft.

It is also an object of the invention to provide fairings that are structurally disposed to fragmentize into small pieces.

These objects and others will be apparent from the following description of the invention, as shown in the drawings in which:

FIGURE 1 illustrates a preferred embodiment of a nose fairing;

FIGURE 2 shows an enlarged fragment of the fairing embodiment of FIGURE 1;

FIGURE 3 shows a preferred embodiment of a tail fairing;

FIGURE 4 shows a modified form of a nose fairing; and

FIGURE 5 illustrates nose and tail fairings in conjunction with a rocket launcher.

Briefly described, the invention comprises a hollow, preferably resin-impregnated, molded fiber cone, said cone being of such construction that it breaks into many small fragments, when the rockets are fired.

The specific configuration of the fairing depends upon competing aerodynamic and structural considerations. Aerodynamically, an ogival shape is to be preferred. Structurally, however, a configuration tending toward the spherical is desirable. The more spherically oriented the shape, the stronger the cone, and the thinner the walls can be, thus reducing the total weight of frangible material. A further advantage of a more spherical configuration, is that a smaller frangible surface is exposed, again reducing the total weight of frangible material. In a preferred embodiment, the fairing is elliptical in configuration, representing the optimum compromise of the aerodynamic and structural considerations.

It is preferred that the fairing be molded out of resin impregnated wood-cellulose fiber. However, any material suitable for molding can be used. The molded structure is preferably made by accreting fibers from an aqueous slurry of fibers onto a porous screen or mold having The desired fragmentation pattern is provided by a fairing molded in the form of a thin-wall fiber shell with a systematic network of structural weaknesses. Specifically, the inner wall of the fairing is raised in certain areas. This results in a system of relatively thick and relatively thin areas in the fairing wall, the outer surface of which is always smooth for aerodynamic reasons.

The thinner areas are preferably of relatively high density fiber, and conversely, the thick areas are preferably of relatively low density. Thus, because of distribution of the fiber in the fairing, it is pre-disposed to break at the weak points of relatively low density.

This pre-disposition to break in certain areas is accentuated by impregnating the fairing with resin. Because of the relatively lower density in the thicker areas, an excessive amount of resin collects in the thicker areas, thus, setting up shear conditions due to the brittleness produced by the presence of excessive resin.

The wall thickness of the molded fiber fairing will vary dependiing upon the structural requirements of the particular configuration used. Typically, in the thin areas, the walls are about 0.06 to 0.07 inch thick. The maximum thickness is from about 0.09 to 0.12 inch.

It is desirable that the fairing break into as small fragments as possible. Almost all skin damage is caused by large fragments, so it is preferable that the pieces obtained upon fragmentation be small, i.e., weights of the order of magnitude of a few grams. Thus the areas of inherent structural weakness should be arranged so that the fragments that are typically produced weigh only a few grams.

A preferred structure for the fairing is illustrated in FIGURES 1 and 2. Therein is shown a one-piece molded fiber fairing 1, with a smooth outer surface 2. In the cut-away portion of FIGURE 1, and in FIGURE 2 can be seen a network of mutually perpendicular ridges (example ridges 3, 4). There is thus formed a grid pattern of approximately 2-inch squares (example square 5) of fiber with about a 0.06 inch wall thickness. The surrounding ridges are about ¼ inch wide and have a wall thickness of about 0.12 inch. It will be observed that the weaker areas are four-sided, being substantially rectangular near the base of the cone and having converging sides near the apex of the cone.

Another modification of the network of structural weaknesses is illustrated in the cut-away portion of FIGURE 3. The fairing 6, as usual, has a smooth outer surface 7. The inner wall is molded into a series of longitudinal segments of two types. The first type of segment (example segment 8) is smooth and has a uniform wall thickness of about 0.06 inch. The second type of longitudinal segment (example segment 9), periodically varies in thickness from a minimum of about 0.06 inch to a maximum of about 0.09 inch to form a regular pattern of steps (e.g., step 10).

FIGURE 1 shows a nose fairing. The nose fairing is of unitary construction, having the network of systematic structural weaknesses located over the entire inner surface. In practice, thus, the entire fairing will fragmentize when the rockets are fired.

FIGURE 3, however, shows a fairing designed for use as a tail cone. It is of three-piece construction, comprising shell 11 and hollow sections 12, 13, the walls of which are preferably about 0.06 to 0.07 inch thick. The network of structural weaknesses is built into only shell 11. It will be observed that the network of weaker areas is composed of longitudinally extending converging areas which are alternately uniform and non-uniform in cross-section, the non-uniform areas having transversely extending stepped portions at spaced intervals from the base to the apex of the cone. Shell 11 and sections 12, 13 are joined at lap joint 14. In practice, the firing of the blast of the first rockets shatters shell 11 into small fragments. However, sections 12, 13 remain attached to the rocket launcher and direct the escaping gasses and debris in a linear rather than radial pattern. This aspect of the invention contributes materially to the object of preventing skin damage to the aircraft.

In FIGURE 4, the network structure shown is similar to that in FIGURE 3, except that a nose cone is illustrated. The outer surface 15 is smooth. The segments 16 are thin and substantially uniform in cross-section. The segments 17 are non-uniform in longitudinal cross-section and contain alternate thick portions 18 and thinner portions 19.

FIGURE 5 shows a nose fairing 20 and a tail fairing 21 attached to a rocket launcher 22 by circular clamps 23 and 24.

A further improvement to fragmentation behavior of fairings is schematically shown in FIGURE 1. Area $a$ of fairing 1 is impregnated with phenolic resin, causing area $a$ to be extremely brittle. The fibers of area $b$ are impregnated in polystyrene solution, which impregnated fibers are considerably less brittle than the impregnated fibers of area $a$.

Suitable impregnating resins for area $a$ are, for example, the thermosetting phenol-formaldehyde and melamine formaldehyde resins (e.g., a 30% by weight solution of phenol-formaldehyde, such as Le Bee LP-90) in isopropanol. Another example is Resinox 594 phenol-formaldehyde, 65% by weight in water-alcohol mixture diluted to 30% by weight using ethanol, 2-butanone or combinations thereof.

In the polystyrene impregnation, a 14% solution of resin in toluene is typically used. The preferred resin to be used is a copolymer of styrene and minor amounts of butadiene (high impact polystyrene). Another useful resin is a terpolymer of styrene, acrylonitrile and butadiene. Yet another is polymerized methylmethacrylate.

In practice, therefore, firing the rockets from the multi-rocket launcher housing results in immediate decapitation of area $a$. Area $b$, however, is not destroyed until the blast of the rocket that has passed from the launcher. The fragmentation of area $a$ into the desired small pieces can be attributed to two features of the invention. The first is the shear condition set up by the regions of varying fiber density. The second is the presence of the resin which causes the molded fiber to be quite brittle and accentuates the tendency to break along the lines of differing density because of its higher concentration in the regions of lower fiber density.

The invention is hereby claimed as follows:

1. A frangible firing comprising a one-piece, molded, hollow substantially cone-shaped shell of fibers impregnated with a brittle resin, a smooth, outer surface on said shell having aerodynamic characteristics enabling it to withstand air pressures to which it is subjected when mounted on a flying aircraft, said shell having thin wall segments alternating both longitudinally and circumferentially with thicker wall segments, said thicker wall segments forming raised portions on the inner surface of said shell, said thicker wall segments having a lower fiber density throughout than the fiber density of said thinner wall segments and being impregnated with said brittle resin at a relative proportion of said resin to said fiber sufficiently greater than the resin to fiber ratio in said thin wall segments to cause said thicker wall segments to be the more brittle segments and to increase the tendency to shear at said thicker portions when said fairing is broken by a rocket fired therethrough.

2. A fairing as claimed in claim 1 in which said hollow shell is ellipsoidal.

3. A fairing as claimed in claim 1 in which said thin wall segments are four sided, being substantially rectangular near the base of the shell and having converging sides near the apex.

4. A fairing as claimed in claim 1 in which said thicker wall segments are ribs formed on the inner wall of said shell.

5. A fairing as claimed in claim 1 in which said thicker wall segments are in the form of steps.

6. A fairing as claimed in claim 1 in which said shell ranges in thickness from 0.06 to 0.12 inch.

7. A fairing as claimed in claim 1 in which said shell consists essentially of cellulose fibers impregnated with a phenolic resin.

8. A fairing as claimed in claim 1 wherein the portion of said shell in the vicinity of the apex is impregnated with a phenolic resin and the other portion of said shell, away from said apex portion, is impregnated with a polystyrene solution.

9. A frangible tail fairing comprising a one-piece, molded, hollow, substantially cone-shaped shell of fibers impregnated with a brittle resin, the outer surface of said shell being smooth and having aerodynamic characteristics enabling it to withstand air pressures to which it is subjected when mounted on a flying aircraft, said shell having thin wall segments alternating both longitudinally and circumferentially with thicker wall segments, said thicker wall segments forming raised portions on the inner surface of said shell, said thicker segments having a lower fiber density throughout than the fiber density of said thinner wall segments and being impregnated with said brittle resin at a relative proportion of said resin to said fiber sufficiently greater than the resin to fiber ratio in said thin wall segments to cause said thicker wall segments to be the more brittle segments and to increase the tendency to shear at said thicker portions when said fairing is applied as a tail fairing to a rocket launcher and a rocket is fired therefrom, said shell having a double wall comprising a hollow molded section snugly fitted within said shell away from the apex portion, whereby when the firing of a rocket shatters the apex portion the double wall area remains attached to the launcher and directs the escaping gases in a linear rather than a radial pattern.

10. A fairing as claimed in claim 9 in which said fairing comprises a plurality of molded shells secured together, one of said shells containing the apex and said alternating thin wall and thick wall areas and the other of said shells containing said hollow molded section.

References Cited in the file of this patent

UNITED STATES PATENTS

| 2,763,189 | Grill | Sept. 18, 1956 |
| 2,802,396 | Montgomery | Aug. 13, 1957 |
| 2,844,073 | Re et al. | July 22, 1958 |

FOREIGN PATENTS

| 578,034 | Canada | July 23, 1959 |
| 1,051,698 | France | Sept. 16, 1953 |